United States Patent [19]

Cook

[11] 4,103,282
[45] Jul. 25, 1978

[54] ACOUSTICAL TIRE PRESSURE VALVE

[75] Inventor: Edward J. Cook, South Hamilton, Mass.

[73] Assignee: Safety Research & Engineering Corporation, North Reading, Mass.

[21] Appl. No.: 627,959

[22] Filed: Nov. 3, 1975

[51] Int. Cl.² ............................................. B60C 23/02
[52] U.S. Cl. ..................................... 340/58; 73/146.8; 116/34 R
[58] Field of Search ........................... 340/58, 60, 240; 116/34 R, 70; 73/146.3, 146.5, 146.8

[56] References Cited

U.S. PATENT DOCUMENTS

| | | | |
|---|---|---|---|
| 1,417,168 | 5/1922 | Harris | 116/34 R |
| 1,467,317 | 9/1923 | Harris | 116/34 R |
| 2,037,969 | 4/1936 | Duty et al. | 116/34 R |
| 3,145,689 | 8/1964 | O'Neal | 116/34 R |
| 3,890,595 | 6/1975 | Barabino | 340/58 |
| 3,934,223 | 1/1976 | Barabino | 340/58 |
| 3,977,355 | 8/1976 | Lorenz et al. | 340/58 |

*Primary Examiner*—John W. Caldwell, Sr.
*Assistant Examiner*—Joseph E. Nowicki
*Attorney, Agent, or Firm*—Morse, Altman, Oates & Bello

[57] ABSTRACT

A pressure-responsive signalling valve for use on pneumatic tires is adapted to generate a highly efficient acoustical signal whenever the pressure within the tire falls outside of a predetermined range. The emitted signal is detected by means of an acoustical receiver which, in turn, is coupled to an alarm typically in the form of a warning light or audio device conveniently located within the vehicle to alert the driver. The acoustical valve employs a rolling or flat seal disc diaphragm and a flat sealing arrangement providing a positive sealing action, minimal friction, low hysteresis and extremely precise pressure response characteristics.

8 Claims, 8 Drawing Figures

ACOUSTICAL TIRE PRESSURE VALVE

BACKGROUND OF THE INVENTION

1. Field Of The Invention

This invention relates generally to tire pressure sensing and signalling devices and more particularly is directed towards a new and improved pressure responsive acoustical valve for use in a tire pressure reporting system.

2. Description Of The Prior Art

In U.S. Pat. Nos. 3,489,998, 3,699,264 and 3,738,308 there are disclosed tire pressure alarm systems for motor vehicles wherein a change in the tire pressure beyond predetermined levels produces an acoustical signal used to actuate an alarm and warn the operator. In general, these systems employ acoustical valves fitted to the wheel and which respond to tire pressure changes by generating acoustical signals whenever the tire pressure exceeds predetermined limits pre-set in the valves. Acoustical pick-up devices in the form of microphones are positioned in close proximity to the wheel to respond to the acoustical signal. Warning devices in the form of lights, buzzers or the like are coupled to the microphone through signal processing circuitry which includes a memory for storing information with respect to a pressure event during the absence of the operator.

It is an object of the present invention to provide improvements in tire pressure reporting valves of the foregoing type. A more specific object is to provide a tire pressure reporting valve in which the moving parts function with minimal friction, low hysteresis and high precision with respect to pressure levels. Another object of this invention is to provide a valve of the above type having a positive pressure sealing action during normal operation. A further object of this invention is to provide a tire pressure monitoring valve and acoustical generator of a highly efficient nature for use with an acoustical sensing system mounted to the vehicle.

SUMMARY OF THE INVENTION

This invention features a pressure responsive acoustical valve for a pneumatic tire comprising a valve housing mountable directly to the wheel rim or to a standard existing valve stem. A spring-biased piston is mounted within a cylindrical chamber in the valve housing with a rolling diaphragm connected between the piston and the cylinder walls, the piston being adapted to open and close air passages by flat seals whenever the pressure within the tire exceeds design limitations. The air released by the valve is delivered to a highly efficient acoustical generator adapted to produce an acoustical signal which is detected by an acoustical sensor in proximity to the wheel. In the preferred form of the invention an edge-tone generator is employed as the acoustical signal generator portion of the valve. The valve, in one form, is adapted for use as a low pressure sensing device while in another form is adapted to monitor both high and low pressure limits of a pneumatic tire.

DETAILED DESCRIPTION OF THE PREFERRED EMBODIMENTS

Figure 1:
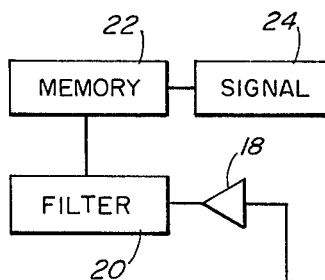
FIG. 1 is a schematic diagram of a tire pressure monitoring system made according to the invention.

Referring now to the drawings and to FIG. 1 in particular, the reference character 10 generally indicates a vehicle, such as an automobile, provided with pneumatic tires 12, each tire being equipped with a pressure-responsive acoustical signal generating valve 14 mounted to the wheel rim or standard valve stem and communicating with the interior of the tire. Associated with each valve 14 is an acoustical receiver 16, typically mounted within the wheel well although other positions may be utilized. The receiver 16 is adapted to detect the emission of an acoustical signal from the valve whenever a tire pressure event occurs. The signal is amplified at 18, processed through circuitry 20 to filter out extraneous background noise and through memory circuitry 22 to an alarm device 24 which may be in the form of a light mounted on the dashboard of the vehicle, a buzzer or both.

The valve 14 may be constructed to respond to a low pressure condition only, to a high pressure condition only, or to respond to both high and low pressure conditions. In practice, a pneumatic tire functions and wears best when the tire pressure is maintained within a certain design range. By way of example, many pneumatic tires for passenger vehicles function best within their design range of 24 to 28 lbs. If the pressure exceeds the upper limit, the tires tend to wear excessively along the center line of the tread, reduce traction and provide a harder ride. Also, excessive tire pressure enhances the changes of a blowout, particularly in an older tire or one with a weakened wall. If the tire pressure is below its designed limit, the tire tread will wear faster along the outer edges of the tread. In addition, the under-inflated tire produces excessive flexing of the side walls reducing tire life as well as generating excessive heat buildup in the tires. Therefore, it is desirable to maintain the tire pressure within the designed limits and to warn the operator whenever the tire pressure exceeds those limits.

Figure 2:
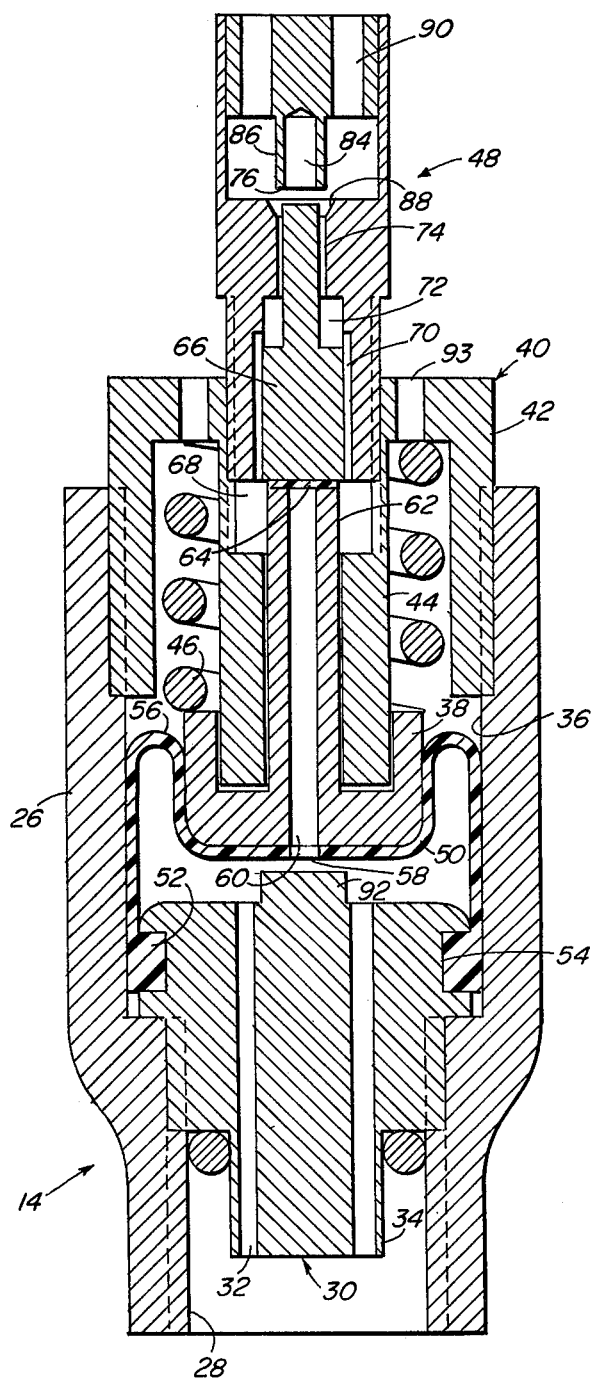
FIG. 2 is a sectional view in side elevation of a pressure responsive acoustical valve made according to the invention and adapted to detect low pressure only.

Referring now more particularly to FIG. 2, there is illustrated a tire pressure monitoring valve 14 adapted to respond to a low tire pressure only. The valve of FIG. 2 functions with minimum friction, with low hysteresis and to extremely close pressure limits. The valve 14 is generally organized about an outer valve body 26, typically cylindrical and, in practice, being small in size perhaps an inch or two in overall length with a diameter of perhaps 1 inch, more or less. The valve 14 in FIG. 2 is designed for mounting directly to a standard valve stem by screwing the same onto the threaded stem. The device may be made for mounting directly to the wheel rim apart from the tire stem in which case a slightly different configuration sould be employed, such as that suggested in FIG. 6.

In FIG. 2, the lower end of the valve body is provided with a tapped axial recess 28 which is adapted to engage the threads of the valve stem. Mounted in the recess 28 is a plug 30 formed with longitudinal passages 32 and threaded or otherwise firmly mounted within the passage and being formed at its lower end with a projection 34 which engages the valve in the tire stem to keep it open once the device 14 is in position. The valve body 26 is formed with axial cylinder 36 in which is mounted a piston 38 adapted for limited reciprocating movement. In the upper end of the cylinder 36 is mounted a cup 40 threaded, pressed or otherwise held firmly in place and formed with an outer annular sleeve 42 and an inner concentric tubular guide 44 about which is mounted a helical spring 46. Mounted in fixed position to the cup 40 is a signal generator 48 adapted to emit acoustical signals when air is released by the valve 14.

In an assembled unit, the plug 30, the cup 40 and the generator 48 remain fixed while the piston 38 is subject to limited reciprocation depending upon the pressure in the tire to which the valve is mounted. The piston 38 is sealed to the sidewalls of the cylinder by means of a flexible, rolling diaphragm 50. The diaphragm 50 may be fabricated of various flexible, air impervious materials such as rubber which may be laminated to a fabric such as DACRON. The outer cylindrical portion of the diaphragm 50 bears against the inner walls of the cylinder 36 while the inner transverse portion of the diaphragm engages the lower end of the piston 38 to which it is bonded by use of a suitable cement or other adhesive.

Figure 7:
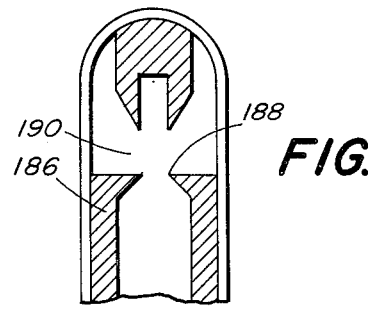
FIG. 7 is a detailed sectional view showing a modified acoustical generator made according to the invention, and, FIG. 8 is a sectional view in side elevation showing yet another modification of the invention.

A fairly large clearance is provided between the piston and the cylinder in order to provide room for a rolling reverse annular bend 56 in the diaphragm which moves up and down along with the movement of the piston. The center of the diaphragm is formed with an opening 58 in register with an axial passage 60 formed in the piston 38. The passage 60 extends up through a stem 62 terminating at a resilient seal 64 bonded to the lower end of a core 66 forming a part of the generator 48. The stem 62 extends through the guide 44 which is formed with an annular chamber 68 about the upper end of the stem 62. The core 66 is mounted firmly in place and defines with walls of the generator 48 passages 70 communicating with the chamber 68 and an annular chamber 72. The chamber 72 communicates with a restricted annular passage 74 which registers with the edges of a whistle 76 mounted to the outer end of the generator 48. In practice, the whistle should be of a high efficiency configuration and in practice an edge tone generator is preferred which is comprised of an acoustical cavity 84 defined by annular walls 86 the lower edges of which register with an annular slit 88 defined by the end of the passage 14. This configuration makes use of an acoustic cavity to reinforce instabilities caused by passage of the annular air stream over the circular knife edge. An alternative generator is shown in FIG. 7 which is of the type known as the Hartman generator.

It will be understood that when air is released by the valve 14 it will pass from the tire, through the valve and against the whistle 76, generating an acoustical signal which will pass through ports 90 to be picked up by the microphone 16 for processing through the circuitry of FIG. 1 and thereby alerting the driver. Under normal operating conditions with proper tire pressure, the piston 38 will be in the position shown in FIG. 2 wherein the upper end of the passage 60 is closed against the seal 64 while the lower end is open. The spring 46 is selected so that the proper air pressure of the tire will apply sufficient force to the diaphragm and to the lower end of the piston to keep it in the upper or closed position. However, should the tire pressure drop for any reason so that the air pressure drops below that of the spring pressure, the spring will cause the piston to move downwardly in which event the upper end of the passage 60 will open to release air through the passage and up into the signal generator to actuate the warning system. This air passage will remain open for a time determined by the rate of loss of the air and in practice will be relatively short, typically on the order of a few seconds to perhaps a minute or so. In any event, as the tire pressure drops, the piston will move down to its lowermost position wherein it will close the lower end of the passage 60, stopping the release of air as well as the generator.

It has been found that the sealing action between the piston, the lower face of which is covered by the diaphragm 50 and the bottom of the cylinder when the piston is in its closed, lower position is enhanced by providing a cylindrical boss 92 which will be somewhat wider than the opening 58. The arrangement provides a very efficient sealing action to prevent escape of air after the valve is closed. Vents 93 are provided in the upper end of the valve body to maintain atmospheric pressure on the top of the piston and diaphragm.

The motion of the piston is relatively small yet sufficient to release a short burst of air to drive the signal generator. Operating parameters may be set to very precise levels with design limits on the order of $\frac{1}{2}$ to 1 psi possible. The use of the rolling diaphragm substantially eliminates errors due to friction and makes possible a valve that operates with no significant hysteresis. The use of the flat seal in both the upper closed and lower closed positions further enhances the valve movement and provides positive closing action in either position. It also allows opening and closing without friction and without the need of O-rings, sliding seals or the like. Thus, the valves may be designed to open when the tire pressure drops to 23 psi and then close at 22 psi, for example. Normally the burst of air released by the valve is quite small and has no appreciable effect on the tire pressure, typically, involving a pressure drop of perhaps one or two pounds.

Figure 3:
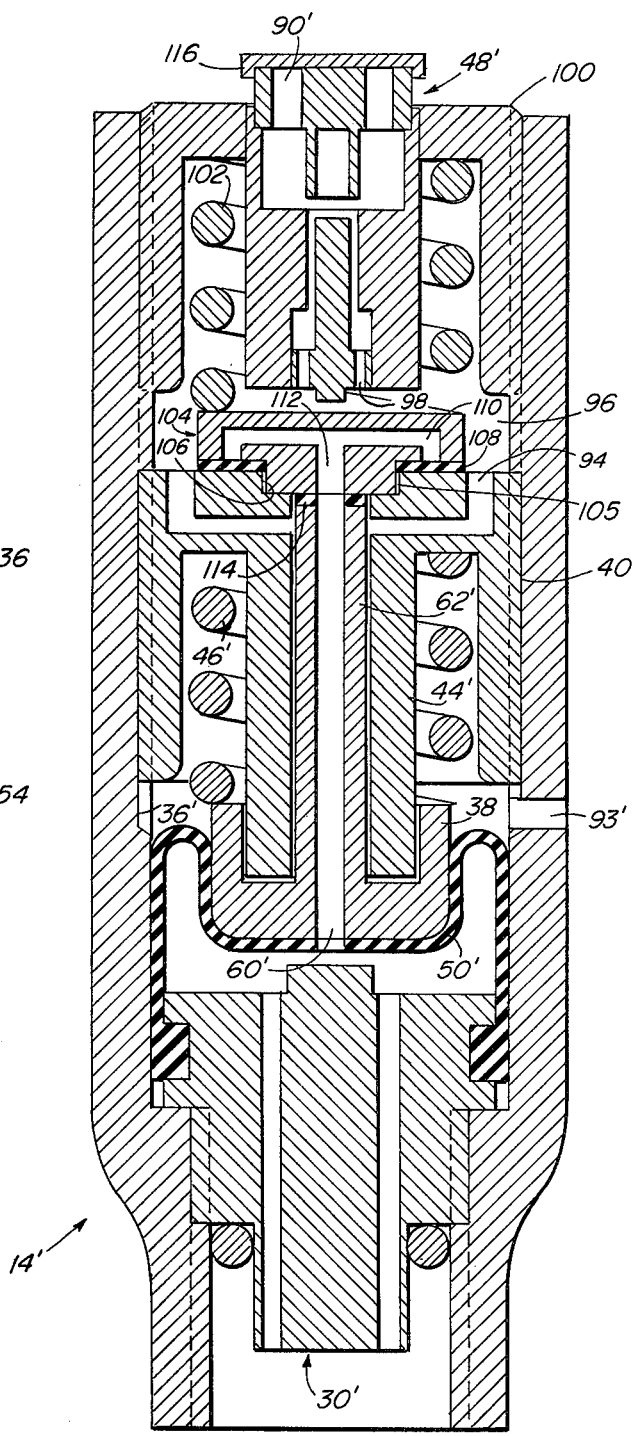
FIG. 3 is a view similar to FIG. 2 but showing a modification thereof adapted to monitor both high and low pressure.

Referring now more particularly to FIG. 3, there is illustrated a modification of the invention and in this embodiment a valve 14' is adapted to produce a warning signal at either low tire pressure or high tire pressure. The lower position of the valve 14' corresponds in function as well as in configuration with the valve 14 of FIG. 2, being provided with a low pressure piston 38' mounted for limited reciprocation within a cylinder 36' and sealed by means of a rolling diaphragm 50' adapted to open and close an air passage 60' formed through a tubular extension 62'. A coil spring 46' serves the same function as the spring 46 of FIG. 2 and is trapped between the piston 38' and a cup 40' which cup includes a tubular guide 44' through which projects the extension 62'. The cup 40' is mounted in fixed position within the valve body and is formed in its upper portions with passages 94 that communicate with the passage 60'. The passages 94 extend radially outward from the passage 60 and communicate with a chamber 96 formed in the upper end of the valve body. This chamber communicates through ports 98 with an acoustical signal generator 48' similar to that described in connection with FIG. 2. The generator 48' is housed within an upper cup member 100 and serves to seat a coil spring 102 the lower end of which bears against a high pressure piston 104 adapted for limited reciprocating movement. The piston 104 includes a reduced lower neck 105 movably mounted within a recess 106 about which is a resilient annular seal 108 adapted to open and close radial passage 110 formed in the high pressure piston 104. The passage 110 communicates with an axial passage 112 registering with the passage 60'. The neck 105 of the high pressure piston 104 includes an annular resilient seal 114 which also seats against the upper end of the extension 62'.

In the event of low tire pressure, the low pressure piston 38' will drop downwardly causing the upper end of the tubular extension 62' to open at the seal 114 thereby releasing air out through the passages 94 into the chamber 96 and then out through the generator 48'.

The upper piston 104 in the FIG. 3 embodiment responds to excess pressure in the tire and will stay open only while the air pressure is above the designed operating range of the valve which, in turn, is selected to match the operating design range of the tire. Thus, the device serves as a safety valve since it relieves excess tire pressure while at the same time warning the operator of the condition. Once the excess pressure is bled off by the valve, the high pressure piston 104 will close automatically under the force of the spring 102.

In order to protect the ports 90 or 90' from being blocked by an accumulation of dirt, salt, ice, etc., various protective measures may be taken such as a blow-off cap 116 which should be sufficiently tight to remain in place during normal running of the wheel but adapted to blow off in the event that the valve 14 is actuated because of an abnormal tire pressure condition.

Figure 4:
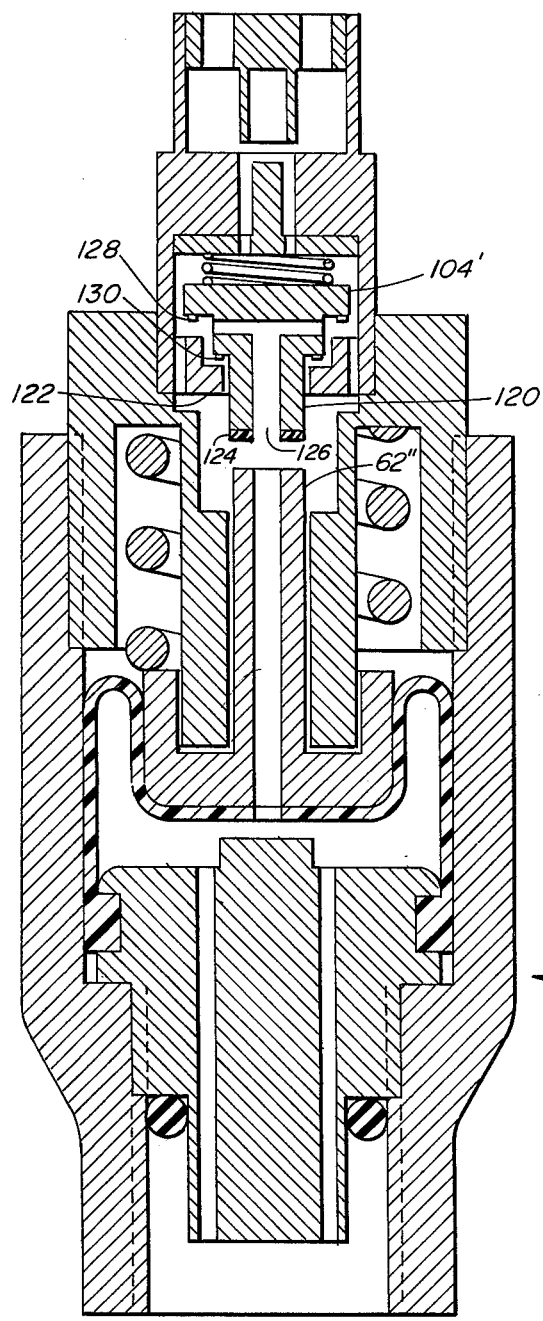
FIG. 4 is a view similar to FIG. 3 but showing a modification thereof.

Referring now to FIG. 4 of the drawings, there is illustrated another modification of the invention and, in this embodiment, there is provided a valve 14" similar to the valve of FIG. 3 being capable of responding to both high and low tire pressure and emitting an acoustical signal on actuation thereof. The primary differences between the valves of FIGS. 3 and 4 reside in the upper piston 104' which, in FIG. 4 is formed with an elongated tubular lower stem 120 extending through an annular collar 122 which serves to guide the stem and the upper piston 104' when it is operated. The lower end of the stem 120 is formed with a seal 124 adapted to engage the upper end of a stem 62" in the same manner as in the FIG. 3 valve. The piston 104 is formed with a T-shaped passage 126 and the head of the piston is sealed by gaskets 128 and 130 against cooperating shoulders formed on the annular collar 122. It will be understood that under high tire pressure conditions the piston 104 will lift, releasing air out through the passage 126 to actuate the signal generator as before.

Figure 5:
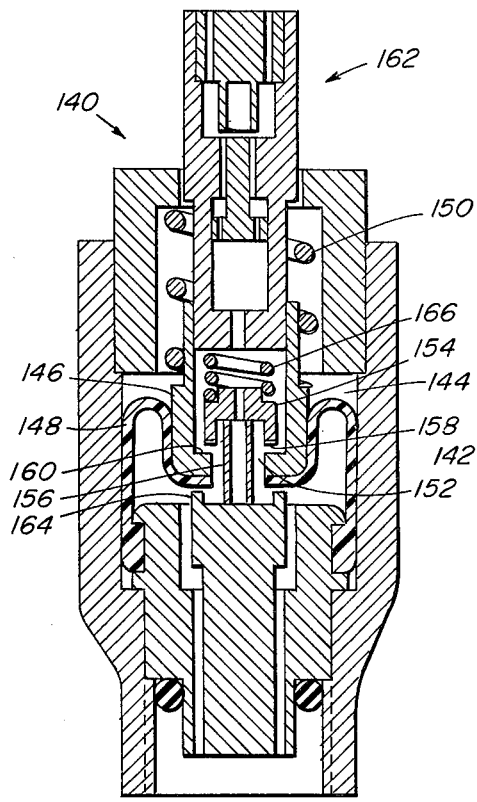
FIG. 5 is a view similar to FIG. 4 but showing a modification thereof.

Referring now to FIG. 5 of the drawings, there is illustrated a further modification of the invention and, again, in this embodiment a valve 140 is provided that is capable of responding to both high and low tire pressures. The valve 140 is provided with a housing 142 similar to those of the other valves and including a cylindrical chamber 144 in which is mounted a piston 146 connected by means of a rolling seal diaphragm 148 to the walls of the cylinder 144. The piston 146 is normally in a raised position to seat against an annular seal 138 with a downward force component provided by a coil spring 150. When the tire pressure drops the piston 146 will also drop into the position illustrated, releasing the air through a central opening 152 which will escape around a high pressure piston 154 whose downward movement is limited by a fixed tubular support 156. It will be noted that the lower end of the high pressure piston 154 is provided with an annular gasket 158 which seals against an annular shoulder 160 formed on the low pressure piston 146. Air will continue to escape actuating the signal generator 162 in the top of the valve until the piston drops down sufficiently to seal against an annular rib 164 formed at the base of the cylinder at which point the air release will stop.

In the event of a high pressure condition the low pressure piston 146 will be in its normal raised position and, once the air pressure is sufficiently high, it will cause the low pressure piston 146 to lift and the high pressure piston 154 to rise against the force of its coil spring 166, unseating it from the tube 156 thereby allowing the air to drive the generator 152.

Figure 6:
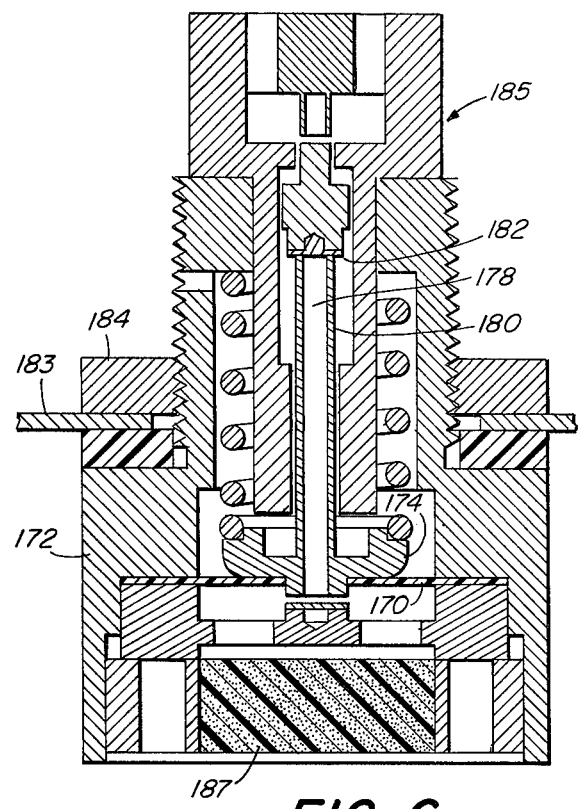
FIG. 6 is a view similar to FIG. 2 but showing a further modification thereof.

In the FIG. 6 embodiment there is shown a flat piston seal diaphragm 170 connecting a cylinder housing 172 to a piston 174 biased against a spring 176 with the piston shown in a normal operating position. The piston is formed with an annular axial passage 178 extending through a stem 180, the upper end of which seats against a fixed gasket 182. The valve configuration allows it to be mounted in an opening of a wheel rim 183 and secured by a nut 184. Under normal tire pressure conditions the passage 178 will be closed against the gasket 182. However, in the event of a drop in tire pressure the piston will drop, opening the passage 178 and releasing air to actuate an acoustical signal generator 185.

In order to protect the seals and the acoustical generator from the effects of dirt particles, a filter 187 is mounted at the tire pressure end of the valve across the air inlet passage. The filter preferably should be highly transparent to the flow of air so as not to interfere with the proper operation of the valve. A porosity down to 15 microns has been found satisfactory using a long fibre composite filter material. Various types of filter materials may be employed and, in practice, all of the valves illustrated should be furnished with a filter.

Referring now to FIG. 7, there is illustrated a modification of the acoustical signal generator and in this embodiment there is shown what is known as a Hartmann generator in which air released by the valve will pass through a nozzle 186 formed with a restricted opening 188 to impinge against an acoustical cavity 190 positioned oppositely the nozzle. In practice, the outside edge around the resonant cavity 190 is chamfered and the diameter of the cavity matches the diameter of the opening 188.

Figure 8:
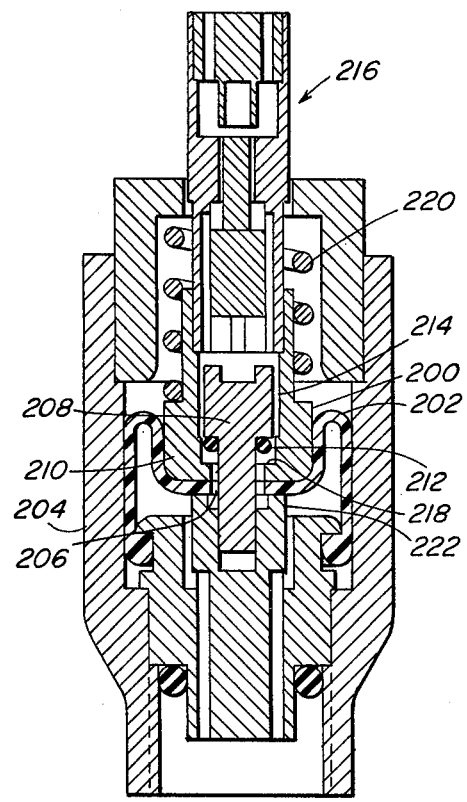

Referring now to FIG. 8 of the drawings, there is illustrated a further modification of the invention which is capable of low pressure actuation only. As before, a piston 200 is connected by means of a rolling seal diaphragm 202 to the cylindrical inner walls of a valve body 204. The piston 200 is formed with a central passage 206 through which extends a fixed center piece 208 formed with an enlarged head defining an annular shoulder 210 having a gasket 212 in the form of an O-ring mounted thereon. An annular passage 214 is formed about the center piece to allow air to move from the lower end of the valve up through a signal generator 216, as before. In its normal operating position the piston 200 will be raised so that the O-ring 212 will seal against a cooperating shoulder 218 formed in the lower end of the piston. When pressure in the tire drops, the force of a spring 220 will cause the piston to lower, whereby air is released through the passage 214 to actuate the signal generator. As pressure continues to drop, the piston will force the inner part of the rolling seal diaphragm down against an annular rib 222, closing the valve and preventing further loss of air.

While the invention has been described in particular reference to the illustrated embodiments, numerous modifications thereto will appear to those skilled in the art.

Having thus described the invention what I claim and desire to obtain by Letters Patent of the United States is:

1. A device for monitoring the internal pressure in a normally pressurized hollow pneumatic tire having an interior and an exterior, comprising:
   (a) a body formed with a cavity therein defining cylindrical inner sidewalls and mountable to a wheel adapted to carry a pneumatic tire,
   (b) a piston having a pair of ends and mounted for limited reciprocation in said cavity,
   (c) a flexible air-impervious rolling seal annular diaphragm connecting said piston to the walls of said cavity, said diaphragm extending across one end of said piston and being formed with a central opening, said diaphragm extending along a portion of the sides of said piston and formed with an annular reverse bend between the sides of said piston and the sidewalls of said cavity,
   (d) said body being formed with a passage communicating with the interior of said tire and one end of said cavity on one side of said piston and diaphragm,
   (e) spring means engaging said piston and urging it toward said one end of said cavity,
   (f) acoustical signal generating means mounted in fixed relative position to one of said body or said piston and responsive to the flow of gas therethrough,
   (g) said piston being formed with a piston passage extending from said one end of said piston in register with the diaphragm opening to the other end of said piston and communicating with said signal generating means, said piston being formed with a passage opening at both ends of said piston,
   (h) said body being formed with at least a pair of seating surfaces, one on either side of said diaphragm and in position to close said piston passage whenever said piston is at either end of its path of travel, said piston passage being open at intermediate positions of said piston whereby a flow of pressurized gas is delivered from said tire through said body passage and said piston passage to said signal generating means.

2. A device, according to claim 1, wherein said signal generating means is a Hartmann generator and includes a member formed with an annular passage and an annular inverted cup mounted in spaced registration with said annular passage.

3. A device according to claim 1 including a closure cap detachably mounted to said signal generator and adapted to be blown off by internal gas pressure upon actuation of said generator.

4. A device according to claim 1 in combination with acoustical signal detecting means and alarm means responsive to said detecting means.

5. A device according to claim 4 including memory means connected to said detecting means for storing an alarm signal upon actuation of said detecting means by said generating means.

6. A device, according to claim 1, including a second piston mounted for reciprocation in said cavity opposite the other end of said piston and adjacent the other end of said piston passage and second spring means normally urging said second piston into a position over said piston passage in the first piston and thereby closing said piston passage, said second piston adapted to open said piston passage whenever the gas pressure in said piston passage is sufficient to bias said second spring means.

7. A device according to claim 1 wherein said one end of said piston about said piston passage opening is flat and said seating surface opposite said piston passage opening is flat and oriented parallel to said one end of said piston.

8. A device for monitoring the internal pressure in a normally pressurized hollow pneumatic tire having an interior and an exterior, comprising,
   (a) a body formed with a cavity therein and mountable to a wheel adapted to carry a pneumatic tire,
   (b) a first piston mounted for limited reciprocation in said cavity,
   (c) a flexible air impervious diaphragm connecting said piston to the walls of said cavity,
   (d) said body being formed with a passage communicating with the interior of said tire and one end of said cavity on one side of said first piston and diaphragm,
   (e) first spring means engaging said first piston and urging it towards said one end of said cavity,
   (f) acoustical signal generating means connected to said body and responsive to the flow of gas therethrough,
   (g) said first piston being formed with a piston passage extending from one end of said first piston to the other end thereof and communicating with said signal generating means,
   (h) said body being formed with at least a pair of seating surfaces, one on either side of said diaphragm and in position to close said piston passage whenever said first piston is at either end of its path of travel, said piston passage being opened at intermediate positions of said piston whereby a flow of pressurized gas is delivered from said tire through said body passage and to said piston passage to said signal generating means,
   (i) a second piston mounted for reciprication in said cavity opposite the other end of said first piston and adjacent to the other end of said piston passage,
   (j) second spring means normally urging said second piston into a position over said piston passage and thereby closing said piston passage,
   (k) said second piston adapted to open said piston passage whenever the gas pressure in said piston passage is sufficient to bias said second spring means.

* * * * *